(12) United States Patent
Geng et al.

(10) Patent No.: US 10,187,291 B2
(45) Date of Patent: Jan. 22, 2019

(54) PATH PLANNING METHOD AND CONTROLLER

(71) Applicant: HUAWEI TECHNOLOGIES CO., LTD., Shenzhen, Guangdong (CN)

(72) Inventors: Yanhui Geng, Shatin (HK); Kai Chen, Hong Kong (HK); Qiang Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 451 days.

(21) Appl. No.: 14/980,491

(22) Filed: Dec. 28, 2015

(65) Prior Publication Data

US 2016/0134512 A1 May 12, 2016

Related U.S. Application Data

(63) Continuation of application No. PCT/CN2015/071729, filed on Jan. 28, 2015.

(30) Foreign Application Priority Data

Jun. 9, 2014 (CN) .......................... 2014 1 0253610

(51) Int. Cl.
*H04L 12/24* (2006.01)
*H04L 12/26* (2006.01)
(Continued)

(52) U.S. Cl.
CPC ........ *H04L 45/125* (2013.01); *H04L 41/0896* (2013.01); *H04L 43/026* (2013.01);
(Continued)

(58) Field of Classification Search
CPC ...... H04L 45/125; H04L 45/72; H04W 24/00; H04W 24/02
See application file for complete search history.

(56) References Cited

U.S. PATENT DOCUMENTS 9,794,165 B1 * 10/2017 Wood .................... H04L 45/125
2012/0016997 A1 1/2012 Naruse
(Continued)

FOREIGN PATENT DOCUMENTS

| CN | 103324592 A | 9/2013 |
|----|-------------|--------|
| CN | 103326884 A | 9/2013 |

(Continued)

OTHER PUBLICATIONS

Martinez et al, "Next generation networks under the SDN and OpenFlow protocol architecture", IEEE, 2015.*
(Continued)

*Primary Examiner* — Omer S Mian
(74) *Attorney, Agent, or Firm* — Huawei Technologies Co., Ltd.

(57) ABSTRACT

The present application provides a path planning method and a controller. The method includes: acquiring data flow information of a to-be-transmitted job in a software-defined network, where the job includes at least one target data flow, and the data flow information of the job includes: a source address, a destination address, and a volume of each target data flow; and performing path planning according to the data flow information, and obtaining a job transmission path used to ensure that the job is transmitted in the software-defined network in a shortest job transmission time, where the job transmission path includes a transmission path corresponding to each target data flow in the job. The present application improves a data transmission speed of a job in an SDN network.

8 Claims, 8 Drawing Sheets

(51) Int. Cl.
*H04L 12/721* (2013.01)
*H04L 12/727* (2013.01)
*H04L 12/729* (2013.01)

(52) U.S. Cl.
CPC ........ *H04L 43/0882* (2013.01); *H04L 45/121* (2013.01); *H04L 45/72* (2013.01)

(56) References Cited

U.S. PATENT DOCUMENTS

| | | | |
|---|---|---|---|
| 2014/0003232 A1 | 1/2014 | Guichard et al. | |
| 2015/0043589 A1* | 2/2015 | Han | H04L 45/38 370/392 |
| 2015/0124622 A1* | 5/2015 | Kovvali | H04W 28/0215 370/236 |
| 2015/0277990 A1* | 10/2015 | Xiong | G06F 9/52 718/106 |
| 2016/0134591 A1* | 5/2016 | Liao | H04L 12/6418 726/15 |
| 2016/0352820 A1* | 12/2016 | Mozolewski | H04L 12/6418 |
| 2017/0149670 A1* | 5/2017 | Backman | H04L 47/2441 |

FOREIGN PATENT DOCUMENTS

| | | |
|---|---|---|
| CN | 103346922 A | 10/2013 |
| CN | 103516602 A | 1/2014 |
| CN | 103650435 A | 3/2014 |
| EP | 2658192 A1 | 10/2013 |

OTHER PUBLICATIONS

Sushant Jain et al., "B4: Experience with a Globally-Deployed Software Defined WAN", Aug. 2013, total 12 pages.

Theophilus Benson et al., "MicroTE: Fine Grained Traffic Engineering for Data Centers", Dec. 2011, total 12 pages.

* cited by examiner

PATH PLANNING METHOD AND CONTROLLER

CROSS-REFERENCE TO RELATED APPLICATIONS

This application is a continuation of International Application No. PCT/CN2015/071729, filed on Jan. 28, 2015, which claims priority to Chinese Patent Application No. 201410253610.2, filed on Jun. 9, 2014, both of which are hereby incorporated by reference in their entireties.

TECHNICAL FIELD

Embodiments of the present application relate to communications technologies, and in particular, to a path planning method and a controller.

BACKGROUND

Software-defined networking (SDN) is a new network architecture. The SDN is characterized by that control and forwarding functions of the network are separated, and the network can be directly programmed, thereby implementing flexible control over the network. Currently, the SDN is applicable to data transmission, and in particular, to transmission of big data (Big data). The SDN can plan a transmission path for data entering the network, so as to quickly transmit massive volumes of data and discover potential business opportunities. However, currently, a problem of the SDN during data transmission is that a data transmission stage occupies a large proportion of an entire data processing completion time, that is, data transmission takes a long time. As a result, big data processing is inefficient.

SUMMARY

An objective of embodiments of the present application is to provide a path planning method and a controller, to improve a data transmission speed of an SDN network.

According to a first aspect, a path planning method is provided, including:

acquiring data flow information of a to-be-transmitted job in a software-defined network SDN, where the job includes at least one target data flow, and the data flow information of the job includes: a source address, a destination address, and a volume of each target data flow; and performing overall path planning on the to-be-transmitted job according to the source address, the destination address, and the volume of each target data flow in the data flow information of the job, where the overall path planning includes simultaneously planning a transmission path corresponding to each target data flow included in the to-be-transmitted job; and obtaining a job transmission path over which the to-be-transmitted job is transmitted in the software-defined network in a shortest job transmission time, where the job transmission time is a time needed to complete transmission of the job in the software-defined network, and the job transmission path includes the transmission path corresponding to each target data flow in the job.

With reference to the first aspect, in a first possible implementation manner, the performing overall path planning on the to-be-transmitted job according to the source address, the destination address, and the volume of each target data flow in the data flow information of the job, where the overall path planning includes simultaneously planning a transmission path corresponding to each target data flow included in the to-be-transmitted job; and obtaining a job transmission path over which it takes a shortest time to complete transmission of the to-be-transmitted job in the software-defined network includes:

determining a path planning condition, where the path planning condition includes that after the corresponding transmission path is allocated to each target data flow, each network node of the software defined network satisfies conservation of volume, each transmission link of the software-defined network satisfies a maximum link capacity limit condition, and a total volume of the job is less than or equal to the job transmission time multiplied by a bandwidth of the job, where the transmission path includes: a transmission link and a bandwidth on the transmission link, the total volume of the job is a sum of a volume of the at least one target data flow, and the bandwidth of the job is a sum of a bandwidth of the at least one target data flow; among the transmission links in the software-defined network, exhaustively listing candidate job transmission paths satisfying the path planning condition, where the candidate job transmission paths include a transmission link corresponding to each target data flow and a bandwidth on the transmission link, and the transmission link is used to transmit the target data flow from the source address to the destination address; and obtaining a corresponding job transmission time for each of the candidate job transmission paths; and selecting the candidate job transmission path corresponding to the minimum job transmission time as a final job transmission path.

With reference to the first aspect or the first possible implementation manner of the first aspect, in a second possible implementation manner, the acquiring data flow information of a to-be-transmitted job in a software-defined network includes: for each target data flow to be transmitted in the software-defined network, acquiring the data flow information of the target data flow, and performing clustering computing according to the data flow information to obtain a job corresponding to the target data flow.

With reference to the second possible implementation manner of the first aspect, in a third possible implementation manner, the performing clustering computing according to the data flow information includes: computing a distance between the target data flow and each candidate job, where the candidate job is located in a job set used to represent all jobs to be transmitted in the software-defined network; and if the distance is less than a first distance threshold corresponding to the candidate job, using the candidate job corresponding to the distance as the job corresponding to the target data flow; otherwise, correspondingly creating a new job for the target data flow, and adding the newly created job to the job set.

With reference to the third possible implementation manner of the first aspect, in a fourth possible implementation manner, the computing a distance between the target data flow and each candidate job includes: computing a time interval between a time at which the target data flow reaches the software-defined network and a time at which the candidate job is last updated; and if the time interval is less than or equal to an update time threshold, continuing to compute a difference between a center of gravity of the candidate job and the volume of the target data flow; and if the difference is less than a second distance threshold, using the difference as the distance between the target data flow and the candidate job.

With reference to the second possible implementation manner of the first aspect, in a fifth possible implementation manner, after the obtaining the job corresponding to the target data flow, before the performing overall path planning on the to-be-transmitted job, the method further includes: if the job satisfies a data flow deletion condition after the target data flow is added to the job, selecting a to-be-deleted update data flow from the job, and deleting a correspondence between the update data flow and the job, where the data flow deletion condition includes at least one of the following: a quantity of data flows between a pair of a map process and a reduce process in the job is greater than one, or a quantity of map processes corresponding to a reduce process of the job exceeds a maximum quantity limit.

According to a second aspect, a controller is provided, including:

an information receiving unit, configured to acquire data flow information of a to-be-transmitted job in a software-defined network SDN, where the job includes at least one target data flow, and the data flow information of the job includes: a source address, a destination address, and a volume of each target data flow; and a path planning unit, configured to perform overall path planning on the to-be-transmitted job according to the source address, the destination address, and the volume of each target data flow in the data flow information of the job, where the overall path planning includes simultaneously planning a transmission path corresponding to each target data flow included in the to-be-transmitted job; and obtain a job transmission path over which the to-be-transmitted job is transmitted in the software-defined network in a shortest job transmission time, where the job transmission time is a time needed to complete transmission of the job in the software-defined network, and the job transmission path includes the transmission path corresponding to each target data flow in the job.

With reference to the second aspect, in a first possible implementation manner, the path planning unit is specifically configured to: determine a path planning condition, where the path planning condition includes that after the corresponding transmission path is allocated to each target data flow, each network node of the software-defined network satisfies conservation of volume, each transmission link of the software-defined network satisfies a maximum link capacity limit condition, and a total volume of the job is less than or equal to the job transmission time multiplied by a bandwidth of the job, where the transmission path includes: a transmission link and a bandwidth on the transmission link, the total volume of the job is a sum of a volume of the at least one target data flow, and the bandwidth of the job is a sum of a bandwidth of the at least one target data flow; among the transmission links in the software-defined network, exhaustively list candidate job transmission paths satisfying the path planning condition, where the candidate job transmission paths include a transmission link corresponding to each target data flow and a bandwidth on the transmission link, and the transmission link is used to transmit the target data flow from the source address to the destination address; and obtain a corresponding job transmission time for each of the candidate job transmission paths; and select the candidate job transmission path corresponding to the minimum job transmission time as a final job transmission path.

With reference to the second aspect or the first possible implementation manner of the second aspect, in a second possible implementation manner, the controller further includes a job classification unit, configured to: for each target data flow to be transmitted in the software-defined network, acquire the data flow information of the target data flow, and perform clustering computing according to the data flow information to obtain a job corresponding to the target data flow.

With reference to the second possible implementation manner of the second aspect, in a third possible implementation manner, the job classification unit includes: a distance computing subunit, configured to compute a distance between the target data flow and each candidate job, where the candidate job is located in a job set used to represent all jobs to be transmitted in the software-defined network; and a job identification subunit, configured to: when the distance is less than a first distance threshold corresponding to the candidate job, use the candidate job corresponding to the distance as the job corresponding to the target data flow; otherwise, correspondingly create a new job for the target data flow, and add the newly created job to the job set.

With reference to the third possible implementation manner of the second aspect, in a fourth possible implementation manner, the distance computing subunit is specifically configured to: compute a time interval between a time at which the target data flow reaches the software-defined network and a time at which the candidate job is last updated; and if the time interval is less than or equal to an update time threshold, continue to compute a difference between a center of gravity of the candidate job and the volume of the target data flow; and if the difference is less than a second distance threshold, use the difference as the distance between the target data flow and the candidate job.

With reference to the second possible implementation manner of the second aspect, in a fifth possible implementation manner, the controller further includes a job updating unit, configured to: when the job satisfies a data flow deletion condition after the target data flow is added to the job, select a to-be-deleted update data flow from the job, and delete a correspondence between the update data flow and the job, where the data flow deletion condition includes at least one of the following: a quantity of data flows between a pair of a map process and a reduce process in the job is greater than one, or a quantity of map processes corresponding to a reduce process of the job exceeds a maximum quantity limit.

In the path planning method and the controller provided in the embodiments of the present invention, by performing overall path planning on a to-be-transmitted job, and using a shortest job transmission time as an objective of the path planning, the path planning is performed from the perspective of the entire job. Compared with path planning using a single data flow as an objective, in the path planning method, a time occupied by data flows of the entire job in a data transmission stage of an SDN network is greatly reduced, a transmission time is the shortest, and a data transmission speed of the job in the SDN network is increased, thereby improving the data processing efficiency of the job.

DESCRIPTION OF EMBODIMENTS

Figure 1:
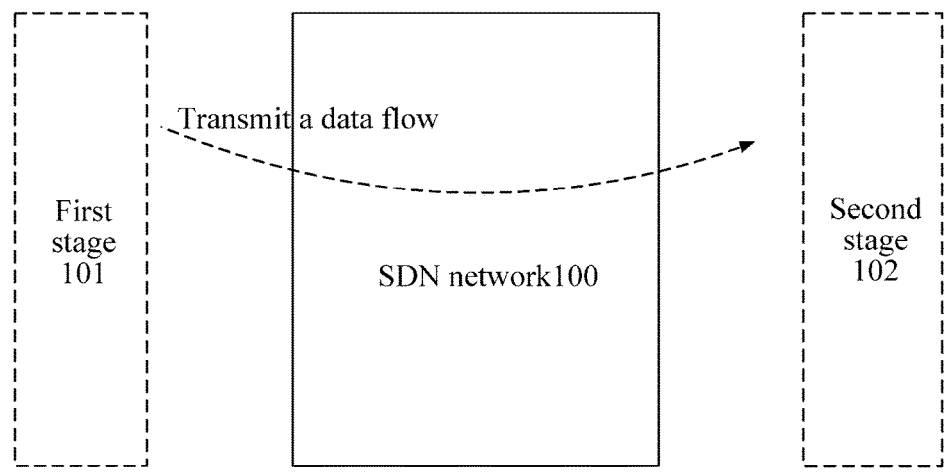
FIG. 1 is a schematic diagram of an application scenario of a path planning method according to an embodiment of the present application.

A path planning method provided in embodiments of the present invention is applicable to data transmission in an SDN network. FIG. 1 illustrates a selectable application scenario for a SDN network 100. FIG. 1 illustrates an application scenario of a path planning method according to an embodiment. In the example, a first stage data 101 is received and processed by the SDN network 100k wherein the SDN network 100 outputs a second stage data 102 from the inputted first stage data 101. In an application scenario of distributed computing, where a Map-Reduce scenario is used as an example (where certainly, specific implementation is not limited thereto), processing data of an intermediate result obtained in a map stage needs to be sent, by using an SDN network, to a host that has a reduce process, so as to perform processing in a reduce stage. More specifically, it is assumed that a matter "counting frequency at which a term appears in a dictionary" needs to be completed, and two steps need to be performed to complete the matter. The first step is performed in the map stage (where the map stage may be the first stage in FIG. 1). For example, in the map stage, a map host may perform processing, and intermediate data is obtained by processing in the map stage. The intermediate data is sent to the reduce stage (where the reduce stage may be the second stage in FIG. 1) by using the SDN network to perform the second step, and then a final result can be obtained. In addition, the intermediate data may be multiple data flows (for example, a data flow corresponding to a result obtained by collecting statistics on the first half of a dictionary by a map host, and a data flow corresponding to a result obtained by collecting statistics on the second half of the dictionary by another map host) during transmission in the SDN network.

As can be learned from the foregoing, if the entire matter "counting frequency at which a term appears in a dictionary" needs to be completed, the completion efficiency of the matter not only is related to execution speeds of the map stage and the reduce stage, but also is related to a data transmission speed of the SDN network. The data transmission speed of the SDN network directly affects the completion efficiency of the entire matter. As shown in studies, in the foregoing application scenario of distributed computing, a time of the data transmission stage occupies more than one-third of an entire computing completion time, and determines the completion efficiency of the entire computation to a great extent. Therefore, the path planning method in the embodiments of the present application is intended to study what path over which data is transmitted in an SDN network, so as to accelerate a data transmission speed of the SDN network.

Figure 2:
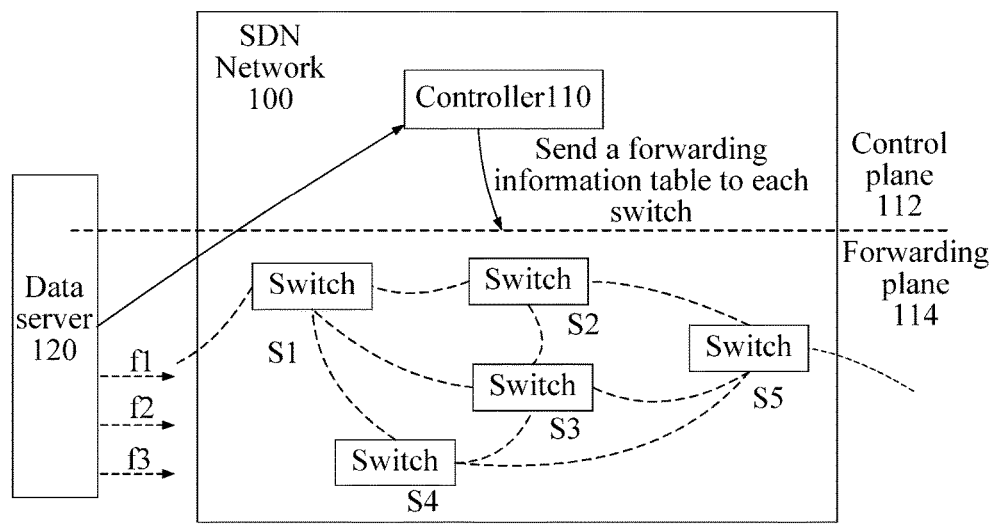
FIG. 2 shows an architecture of an SDN network to which a path planning method is applied according to an embodiment of the present application.

FIG. 2 shows an architecture of an SDN network 100 to which a path planning method is applied according to an embodiment. The SDN network 100 separates a control plane 112 from a forwarding plane 114. A forwarding device on the forwarding plane 114, such as a switch S1/S2/S3/S4/S5, is configured to transmit a data flow entering the SDN network 100. A controller 110 disposed on the control plane 112 may be configured to compute a forwarding path of a data flow, and generate a forwarding information table according to the forwarding path and send the forwarding information table to the switch S1/S2/S3/S4/S5. The controller 110 can communicate with each switch S1-S5, for example, and can send a forwarding information table by using an Openflow protocol. In this embodiment, the path planning method in the embodiments of the present invention may be executed by the controller 110 disposed in the SDN network 100. Certainly, the controller 110 may also have other functions besides path planning, for example, may generate a forwarding information table according to a planned path.

How the controller executes the path planning method is described below by using FIG. 2 as an example. Before the method is described, it needs to be first emphasized that a path planned in the path planning method in the embodiments of the present invention is a "job transmission path". Two basic concepts involved in the method are briefly described as follows:

Job: In the foregoing example "counting frequency at which a term appears in a dictionary", this matter may be referred to as a "job", that is, a job is a data processing matter.

Job transmission path: In a distributed computing scenario, a job may be jointly completed by multiple hosts. For example, in a map stage, multiple map hosts perform processing, and each host generates a data flow. Assuming that there are three hosts, there may be three data flows, and data of the three data flows actually belongs to a same "job". For example, in the foregoing example, a result obtained by collecting statistics on the first half of a dictionary by a map host corresponds to a data flow, and a result obtained by collecting statistics on the second half of the dictionary by another map host corresponds to a data flow. All the multiple data flows need to be transmitted in an SDN network, and a transmission path of each data flow in the SDN network actually needs to be planned. Transmission paths of all the data flows are collectively referred to as a "job transmission path", that is, a job transmission path includes transmission paths separately corresponding to data flows in a job.

Job transmission time: A time needed to complete transmission of an entire job in an SDN network is a job transmission time. Assuming that a job has three data flows, a time taken to complete transmission of all the three data flows in the SDN network is a job transmission time.

Figure 3:
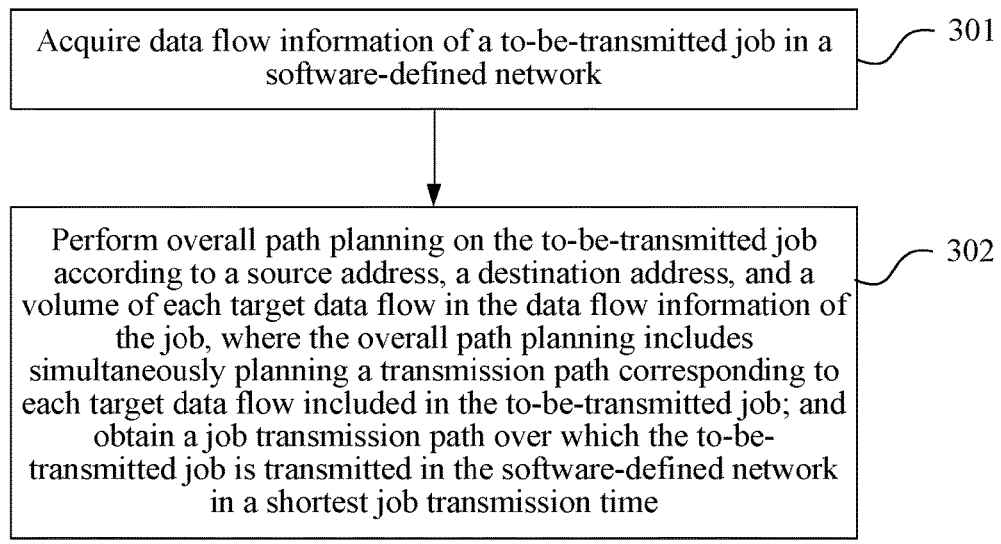
FIG. 3 is a schematic flowchart of a path planning method according to an embodiment of the present application.

FIG. 3 is a schematic flowchart of a path planning method according to an embodiment of the present invention. As shown in FIG. 3, the method may include:

301: Acquire data flow information of a to-be-transmitted job in a software-defined network.

It is assumed that the to-be-transmitted job in the SDN network includes three data flows: f1, f2, and f3. Referring to FIG. 2, in this step, the to-be-acquired data flow information of the job includes data flow information of the three data flows. In this embodiment, all the three data flows are to be transmitted in the SDN network, and all the data flows may be referred to as target data flows.

The data flow information includes: a source address, a destination address, and a volume of each target data flow. FIG. 2 is used as an example. Identifiers of switches on the forwarding plane are S1 to S5; and it is assumed that a source address of the data flow f1 is S1, a destination address is S4, and a volume is 30 Mbit, a source address of the data flow f2 is S1, a destination address is S5, and a volume is 60 Mbit, and the like. Other data flows are not described through examples.

Optionally, a controller may acquire the data flow information in multiple manners.

For example, a device except the controller (even outside the SDN network) analyzes a data flow to be transmitted in the SDN network, so as to identify a job corresponding to each data flow, and sends the data flow information of at least one data flow belonging to a same job (where the data flow information may be acquired from data packets of the data flows) to the controller.

More specifically, referring to FIG. 2, the device may be, for example, a data server 120 outside the SDN network. The data server 120 may receive a data flow generated by a host in a map stage, analyze the data flow to identify a job, and send data flow information of data flows belonging to a same job to the controller, and the controller performs path planning according to the data flow information. In addition, the data server 120 may send the data flow information of the job to the controller before a data flow of the job is sent to the SDN network, so that the controller can compute a transmission path of the data flow in advance, and forwarding can be quickly implemented when the data flow reaches a switch of the SDN network, thereby accelerating a data transmission speed.

For another example, the controller may identify a job corresponding to each data flow, and extract data flow information to perform path planning. In this case, actually both the job identifying function of the data server 120 and the path planning function are performed by the controller.

More specifically, for example, after a host in the map stage generates a data flow, data flow information of each data flow may be first sent to the controller before the data flow is sent to the SDN network. The controller identifies a job corresponding to a data flow, obtains data flow information of data flows belonging to a same job, and performs path planning according to the data flow information. Alternatively, after a host in the map stage generates a data flow, the data flow may be directly sent to the SDN network, and first reach a switch of the SDN network; the switch extracts data flow information of the data flow and sends the data flow information to the controller; and the controller then identifies, according to the data flow information, a job corresponding to the data flow, and performs path planning according to data flow information of data flows of a same job.

302. Perform overall path planning on the to-be-transmitted job according to a source address, a destination address, and a volume of each target data flow in the data flow information of the job, where the overall path planning includes simultaneously planning a transmission path corresponding to each target data flow included in the to-be-transmitted job; and obtain a job transmission path over which the to-be-transmitted job is transmitted in the software-defined network in a shortest job transmission time.

In this embodiment, when the controller performs path planning according to the data flow information, the controller uses the entire job as a planning subject, performs overall path planning on the job, and uses a shortest job transmission time as a planning objective. The obtained job transmission path includes the transmission path corresponding to each target data flow in the job, and the "transmission path" includes a transmission link for transmitting a data flow and an allocated bandwidth. FIG. 2 is still used as an example, and for the data flow f2, a source address is S1, a destination address is S5, and a volume is 60 Mbit. A transmission path allocated to the data flow f2 after path planning may be "S1-S2-S5, where a bandwidth of 60 M is allocated on each transmission link (which includes a link S1-S2 and a link S2-S5)".

That is, for each target data flow in the job, there may be multiple optional transmission paths for transmission from a source address to a destination address. For example, the data flow f2 from S1 to S5 may follow "S1-S2-S5", "S1-S3-S5", or the like. The data flow f2 may even be divided into two paths, and one path follows "S1-S2-S5", and the other path follows "S1-S3-S5", or the like. However, by transmitting the job over the job transmission path obtained according to the path planning method in this embodiment of the present invention, the job transmission time of the job in the SDN network is the shortest, and because the job transmission time of the job in the SDN network is shortened, the overall completion efficiency of the job inevitably is improved.

It should be noted that an emphasis of the path planning method in this embodiment of the present invention is that computing is performed according to the data flow information of the job. That is, computing is performed with reference to data flow information of all target data flows included in the to-be-transmitted job in the SDN network, to obtain the transmission path of each target data flow. For example, when overall path planning is performed on the job, the transmission paths separately corresponding to the target data flows included in the to-be-transmitted job are simultaneously planned. Another emphasis is that computing is performed by using a shortest job transmission time as a planning objective. However, as for what computing method is specifically used to perform path planning, there may be multiple manners in specific implementation, which is not limited in this embodiment of the present invention.

Optionally, a computing method for path planning is provided as follows:

First, a path planning condition, that is, a condition needing to be satisfied after a transmission path is allocated to a target data flow, is determined. The condition may include condition 1 to condition 3 as follows:

Condition 1: Each network node of the SDN network satisfies conservation of volume, which may be represented by the following formula (1):

$$\sum_u b_{ij}^{uv} - \sum_u b_{ij}^{vu} = \begin{cases} d_{ij}, & v = j \\ -d_{ij}, & v = i \\ 0, & \text{otherwise} \end{cases} \quad (1)$$

In the formula, u and v are network nodes in the SDN; $b_{ij}^{uv}$ represents a bandwidth allocated to a target data flow (i, j) on a transmission link (u, v), where i represents a source address of the target data flow, and j represents a destination address of the target data flow; $d_{ij}$ represents a total bandwidth allocated to the target data flow (i, j). Formula (1) indicates that on a transmission link (u, v) in the SDN, for a difference between all traffic flowing into the node v and all traffic flowing out from the node v, if v is the destination address j, a net inflow exists at the node v (because traffic terminates at the node v), where a volume of the net inflow is the bandwidth $d_{ij}$ allocated to the target data flow (i, j); if v is the source address i, a net outflow exists at the node v (because traffic starts at the node v), where a volume of the net outflow is also the bandwidth allocated to the target data flow (i, j), and there is a minus sign only because it is a net outflow; if v is neither the source address i nor the destination address j, and is an intermediate node of the SDN network, an inflow at the node v corresponds to an outflow of an equivalent volume, and in this case, a net inflow is zero.

Condition 2: Each transmission link of the SDN network satisfies a maximum link capacity limit condition, which may be represented by the following formula (2):

$$\sum_{i,j} b_{ij}^{uv} \leq B_{uv} \quad (2)$$

In the formula, $B_{uv}$ is a maximum bandwidth capacity of the transmission link (u, v). Formula (2) indicates that a total sum of bandwidths allocated to different target data flows (i, j) on the transmission link (u, v) cannot exceed the maximum capacity of the transmission link.

Condition 3: A total volume of the job to be transmitted in the SDN network is less than or equal to the job transmission time multiplied by a bandwidth of the job, which may be represented by the following formula (3):

$$v_{ij} \leq T d_{ij} \quad (3)$$

In the formula, $v_{ij}$ is a total volume of the target data flows (i, j), T is a job transmission time, and $d_{ij}$ is obtained in formula (1). Formula (3) indicates a constraint on "a data transmission time and a total volume". That is, the total volume corresponding to the target data flows (i, j) cannot be greater than the job transmission time T (that is, a maximum completion time among completion time corresponding to all the target data flows) multiplied by a total bandwidth allocated to the job; otherwise, transmission of data corresponding to the job cannot be completed within the time T. The total volume of the job is a sum of volumes of all the target data flows included in the job, and the bandwidth of the job is a sum of bandwidths of all the target data flows.

Next, after the path planning condition is determined, among the transmission links in the SDN network, candidate job transmission paths satisfying the path planning condition are exhaustively listed, where the candidate job transmission paths include a transmission link corresponding to each target data flow and a bandwidth on the transmission link, and the transmission link is used to transmit the target data flow from the source address to the destination address; and a corresponding job transmission time is obtained for each of the candidate job transmission paths.

FIG. 2 is still used as an example, and it is assumed that a job to be transmitted in the SDN network includes three target data flows: f1, f2, and f3, and data flow information corresponding to the three target data flows is that a source address of the data flow f1 is S1, a destination address is S4, and a volume is 30 Mbit, a source address of the data flow f2 is S1, a destination address is S5, and a volume is 60 Mbit, and the like. For example, when a transmission path is designed for f2, multiple transmission links and bandwidths may be selected. The transmission path may be S1-S4-S5, a bandwidth of 6 M is allocated to S1-S4, and a bandwidth of 5 M is allocated to S4-S5; or an S1-S2-S5 path may be followed, a bandwidth of 6 M is allocated to S1-S2, and a bandwidth of 3 M is allocated to S2-S5. Other manners are not described through examples. In this embodiment, possible transmission links and bandwidth manners of the transmission links are exhaustively listed for each target data flow provided that the data flow can be transmitted from a source address to a destination address. Each time after a possible job transmission path is listed, whether the job transmission path is feasible is checked by using the foregoing path planning condition. If all the foregoing three conditions are satisfied, it indicates that the job transmission path is feasible, and may be referred to as a candidate job transmission path. In addition, a corresponding job transmission time may be obtained for each candidate job transmission path. That is, when different transmission paths are designed for target data flows of the job, corresponding transmission time of the job may also be different.

Finally, the candidate job transmission path corresponding to the minimum job transmission time is selected as a final job transmission path from the results exhaustively listed above. That is, by transmitting the job over the job transmission path selected in this embodiment of the present invention, a transmission time of the job in the SDN network is the shortest, thereby accelerating a job completion speed.

Further, the three formulas corresponding to condition 1 to condition 3 mentioned above do not belong to standard linear programming during specific problem resolving. To resolve a problem within a shortest time and increase a speed at which a final result is obtained, this embodiment of the present invention further provides a problem resolving method for converting the foregoing formulas into linear programming, which is as follows:

$$\text{minimize} \sum_{i,j} d_{ij}$$

That is, the foregoing formula (1) to formula (3) are still used, but an objective of resolving is converted from minimization of T to minimization of $$\sum_{i,j} d_{ij},$$

so as to be converted into linear programming. Specifically, it may be initialized that T1=0, T2 is a large number, and T=(T1+T2)/2, and formula (1) to formula (3) are then verified; and if all the formulas are satisfied, updating is performed so that T2=T, T=(T1+T2)/2, and the formulas are verified again; otherwise, updating is performed so that T1=T, T=(T1+T2)/2, and the formulas are verified again. When a difference between T1 and T2 is less than a given threshold, the computation of this algorithm is ended.

The path planning method in this embodiment of the present invention is described in detail above. If the method in this embodiment of the present invention is compared with a conventional method, in the conventional method, path planning is performed on each single data flow entering an SDN network, and a planning objective may be load balancing, a shortest path, or the like, but in the method in this embodiment of the present invention, a job transmission path is planned according to all data flows included in a job, planning is performed on a per-job basis, and a shortest transmission time of the entire job is an objective. Therefore, compared with the conventional method, the method in this embodiment can accelerate a job processing speed inevitably.

The following provides two test examples, to show that the method in this embodiment achieves an obvious effect of increasing a data transmission speed.

Example 1

Figure 4:
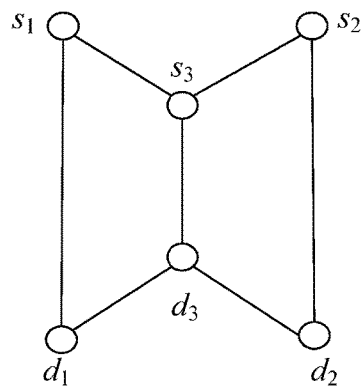
FIG. 4 is topology view 1 of an effect test of a path planning method according to an embodiment of the present application.

Referring to FIG. 4, FIG. 4 is topology view 1 of an effect test of a path planning method according to an embodiment of the present invention. Link bandwidths are (s1, d1) 5 M, (s2, d2) 10 M, and (s3, d3) 15 M, and bandwidths of other links are 30 M. It is assumed that there are two jobs in a network, each job includes two data flows, and specific information is as follows:

Job 1 includes: a data flow 1_1 of s1→d1 and 30 Mbit, and a data flow 1_2 of s1→d3 and 30 Mbit.

Job 2 includes: a data flow 2_1 of s2→d2 and 30 Mbit, and a data flow 2_2 of s2→d3 and 30 Mbit.

If a conventional path planning mechanism is used, the four data flows follow paths s1→d1, s1→s3→d3, s2→d2, and s2→s3→d3. It can be seen that the link (s3, d3) is shared by the two data flows. Because the jobs corresponding to the data flows are not known, the two data flows equally use the transmission link and each occupy 7.5 Mbits. It can be learned through computing that completion time of job 1 and job 2 are respectively 6 seconds and 4 seconds. When the method in this embodiment of the present invention is used, the jobs corresponding to the data flows are already known; and after path planning is performed on the data flows, a bandwidth of 7.5 Mbits is not allocated to the data flow 1_2 on the link (s3, d3), and only a bandwidth of 5 Mbits is allocated to the data flow 1_2 on the link (s3, d3), and a bandwidth of 10 Mbits is allocated to the data flow 2_2. In this way, completion time of job 1 and job 2 are respectively 6 seconds and 3 seconds, and the completion time of job 2 is shortened.

Example 2

Figure 5:
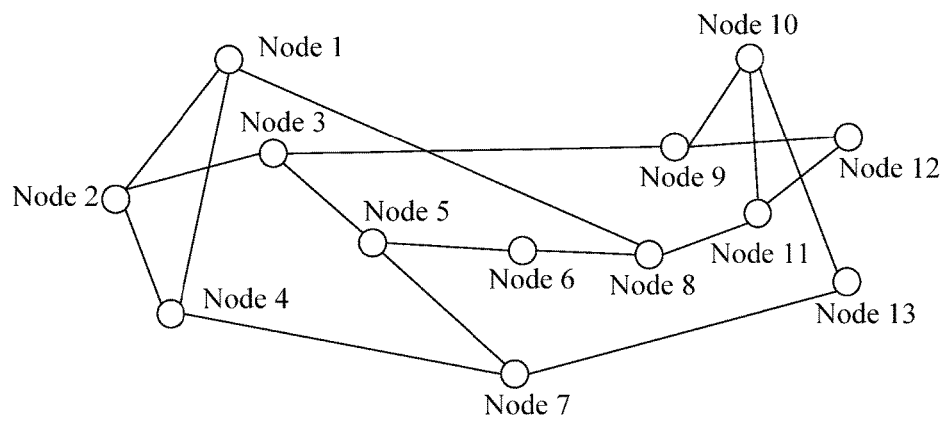
FIG. 5 is topology view 2 of an effect test of a path planning method according to an embodiment of the present application.
Figure 6:
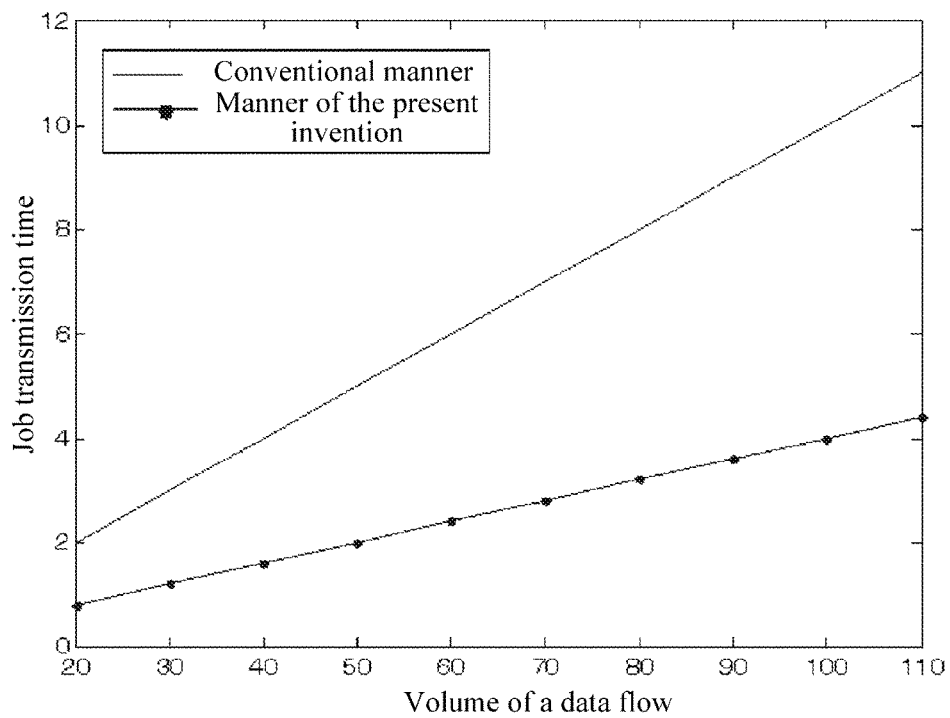
FIG. 6 is a schematic diagram of a job transmission time of a test example corresponding to FIG. 5.

FIG. 5 is topology view 2 of an effect test of a path planning method according to an embodiment of the present invention. In FIG. 5, 13 topology nodes are included, and are node 1 (NorthwestNet), node 2 (BARRNet), node 3 (West-net), node 4 (SDSCNET), node 5 (NCAR/USAN), node 6 (MIDnet), node 7 (Sesquinet), node 8 (NCSA/UIUC), node 9 (Merit), node 10 (CNSF/NYSERNet), node 11 (PSCNET), node 12 (JVNC), and node 13 (SURAnet). FIG. 6 is a schematic diagram of a job transmission time of a test example corresponding to FIG. 5. In FIG. 6, the lateral axis represents a volume of a data flow (Size of Each Flow), the longitudinal axis represents a job transmission time (Job completion time), a line with dots represents a result obtained by using the path planning method in this embodiment of the present invention, and the other line represents a result obtained by using a traditional path planning manner (equal-cost multi-path routing (Equal-Cost Multi-Path routing, ECMP for short)). With reference to FIG. 5 and FIG. 6, a preliminary experiment is conducted in the topological environment of FIG. 5, a bandwidth of each link is 160 Mbits, and data is sent between two pairs of source addresses and destination addresses. Data of different data amounts is shown in the following table 1. As can be learned, by performing path planning by using the method in this embodiment of the present invention, compared with the traditional ECMP mechanism, a job completion time is shortened by more than 40%, and transmission performance of an SDN network is greatly improved.

TABLE 1

| Job transmission time of different data amounts | | | | | | | | | | |
|---|---|---|---|---|---|---|---|---|---|---|
| Flow size | 20 | 30 | 40 | 50 | 60 | 70 | 80 | 90 | 100 | 110 |
| ECMP completion time | 2 | 3 | 4 | 5 | 6 | 7 | 8 | 9 | 10 | 11 |
| Completion time in this Solution | 0.7998 | 1.1982 | 1.6025 | 1.9971 | 2.3975 | 2.7979 | 3.1982 | 3.5986 | 3.9990 | 4.3994 |

After a job transmission path is planned for a job to be transmitted in the SDN network, the controller may further generate a forwarding information table according to the path. In this embodiment, because path planning is performed based on a job including multiple data flows, all transmission paths of the target data flows included in the job are obtained at one time. Accordingly, forwarding information tables corresponding to the target data flows are then generated according to the paths. The controller may send the forwarding information tables to switches, and the switches forward the target data flows according to the forwarding information tables.

Figure 7:
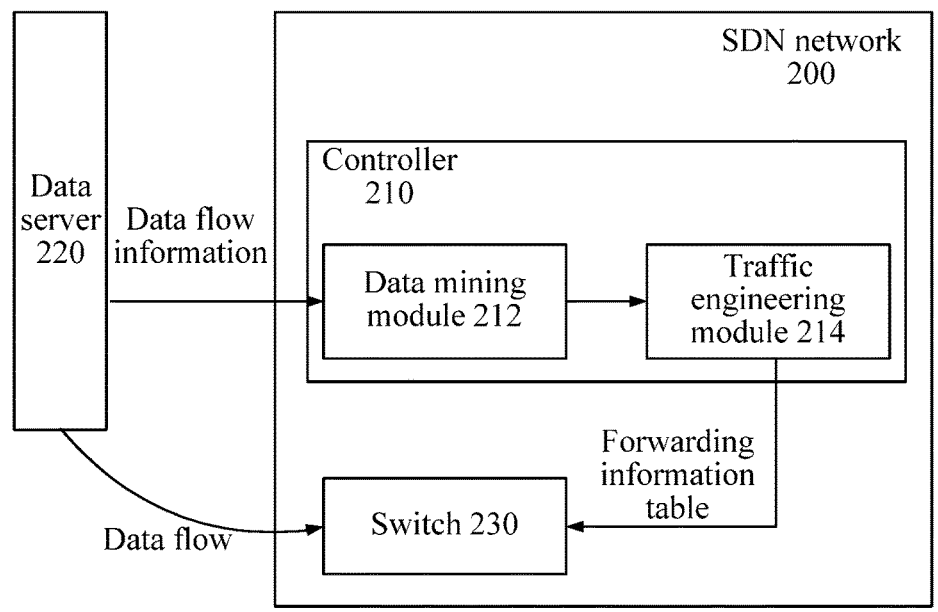
FIG. 7 is schematic diagram 1 of an application layout of a path planning method according to an embodiment of the present application.

As described above, in this embodiment of the present invention, path planning needs to be performed according to data flow information of a job, that is, which data flows belong to a same job needs to be first known. If a module for analyzing a data flow to identify a corresponding job is referred to as a "data mining module", and a module for performing path planning according to data flow information of a job to obtain a job transmission path is referred to as a "traffic engineering module", the "data mining module" provides an auxiliary function for the "traffic engineering module", and is mainly configured to output the data flow information of the job to the "traffic engineering module". In specific implementation, these two modules may be designed in multiple possible layout manners, and several optional manners are simply listed as follows:

For example, FIG. 7 is a schematic diagram 1 of an application layout of a path planning method according to an embodiment of the present invention. As shown in FIG. 7, both the data mining module 212 and the traffic engineering module 214 may be located in a controller 210 of an SDN network 200. A data server 220 may be, for example, a host in a map stage; and after the host generates a data flow, and before the host sends the data flow to a switch S0, the host may send data flow information (for example, a source address, a destination address, and a volume of the data flow) to the data mining module 212 of the controller 210 in advance. The data mining module 212 performs clustering computing according to the data flow information, so as to obtain a job corresponding to the data flow, and sends data flow information of target data flows belonging to a same job (where it may be that only data flows belonging to a same job are referred to as "target data flows" after the job is identified; certainly, it may be that all data flows to be transmitted in an SDN network 200 are referred to as target data flows) to the traffic engineering module; and the traffic engineering module 214 performs path planning, and generates a forwarding information table and sends the forwarding information table to a switch 230, so that the switch 230 forwards a data flow according to the forwarding information table.

Figure 8:
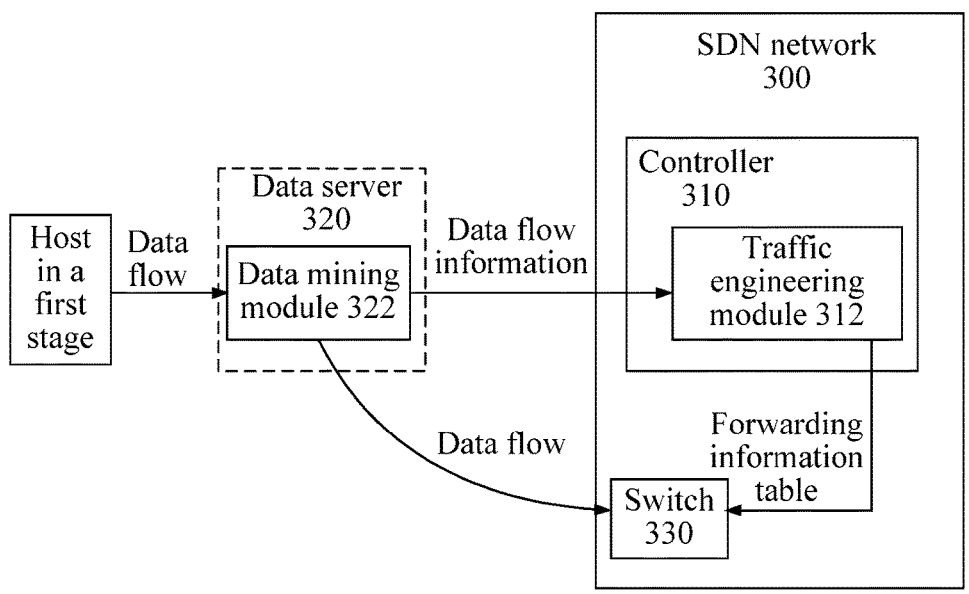
FIG. 8 is schematic diagram 2 of an application layout of a path planning method according to an embodiment of the present application.

For another example, FIG. 8 is a schematic diagram 2 of an application layout of a path planning method according to an embodiment of the present application. As shown in FIG. 8, the data mining module 322 may be placed outside an SDN network 300. This module may be disposed on an external device such as a data server 320, and only the traffic engineering module 312 is disposed in a controller 310 of the SDN network. After the data server 320 receives a data flow sent by a host in a first stage (a map host), the data mining module 322 in the data server 320 performs clustering computing according to data flow information to identify a job corresponding to each data flow. In addition, the data server may send a job to a switch 330 after the data server 320 determines that all data flows in the job are obtained. Moreover, before the data server 320 sends the job to the switch 330, the data server may send data flow information of the data flows to the traffic engineering module 312 of the controller 310 in advance to perform path planning, so that when a data flow subsequently reaches the switch, the switch can forward the data flow according to a forwarding information table as soon as possible.

Figure 9:
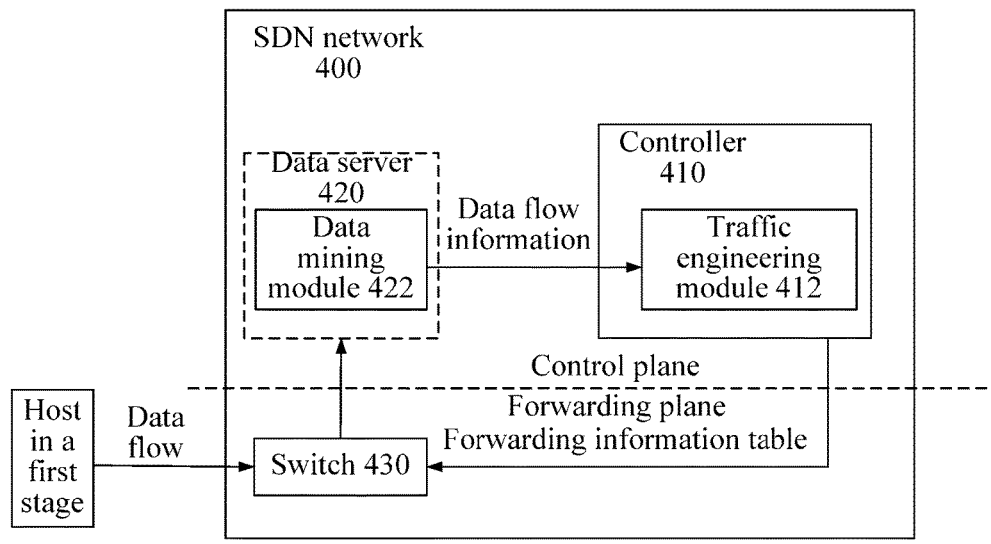
FIG. 9 is schematic diagram 3 of an application layout of a path planning method according to an embodiment of the present application.

For still another example, FIG. 9 is a schematic diagram 3 of an application layout of a path planning method according to an embodiment of the present application. As shown in FIG. 9, both the data mining module 422 and the traffic engineering module 412 may be located on a control plane of an SDN network 400, but are separately disposed on different devices. The data mining module 422 is disposed on a data server 420, and the traffic engineering module 412 is disposed on a controller 410. After a data flow generated by a host in a first stage (a map host) is sent to a switch of an SDN network, if the switch has no forwarding information table corresponding to the data flow, data flow information corresponding to the data flow may be acquired and sent to the data server 420, so that the data server 420 identifies a job corresponding to the data flow. After the data server 420 identifies all data flows included in the job, the data server 420 may send the data flows to the traffic engineering module 412, so that the traffic engineering module performs path planning for the job, and finally generates a forwarding information table according to a planned path and sends the forwarding information table to a switch 430.

Certainly, other manners may also be used in specific implementation, and FIG. 7 to FIG. 9 are merely used as an example. For example, it is even possible that both the data mining module and the traffic engineering module are located outside an SDN network, and the two modules are disposed on a same device or different devices. In this case, a controller of the SDN network only needs to generate a forwarding information table according to a planned path sent by the traffic engineering module and send the forwarding information table to a switch. Other application manners are not enumerated, and these application manners all fall within the scope of this embodiment of the present application provided that a corresponding job can be identified for each data flow to be transmitted in the SDN network, and path planning can be performed based on the job to obtain a job transmission path having a shortest transmission time. In addition, it should be further noted that in the foregoing examples, the data flow information used during clustering computing is basically the same as the data flow information used during path computing. That is, in this embodiment, after the data flow information (for example, a source address and a destination address) is extracted from service flows, a series of processes such as clustering computing and path planning can be completed according to the information without the need for additional information, which is rather simple and fast.

An optional algorithm used by the data mining module is listed below, that is, the data mining module may specifically identify a job corresponding to a data flow by actually using multiple clustering algorithms such as a k-means algorithm, an Expectation-maximization algorithm, and a Mean-shift algorithm. Even classification algorithms such as a Decision trees algorithm, a kNN algorithm, a Linear regression algorithm, and a Logistic regression algorithm may also be used to identify a job corresponding to a data flow. In this embodiment of the present application, a process of identifying a task of a data flow is described in detail by using the k-means clustering algorithm as an example.

Figure 10:
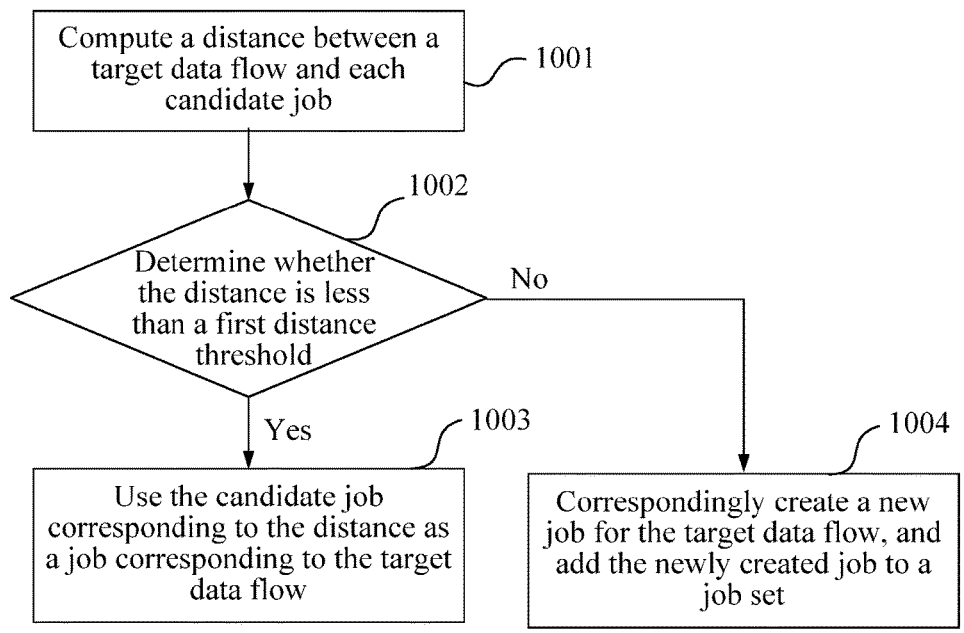
FIG. 10 is a flowchart of job identification in another path planning method according to an embodiment of the present application.

FIG. 10 is a flowchart of job identification in another path planning method according to an embodiment of the present application. As shown in FIG. 10, the k-means clustering algorithm may include steps as follows:

1001: Compute a distance between a target data flow and each candidate job.

The target data flow described herein refers to a data flow to be transmitted in an SDN network, the candidate job is located in a job set, and the job set includes all jobs to be transmitted in the SDN network. Optionally, the jobs in the job set may be jobs obtained in a previous data flow identification process, or the jobs to be transmitted in the SDN network may be known in advance. For example, $j_i$ may be used to represent a job whose number is i, namely, a candidate job, $J=\{ji\}$ is used to represent the job set, a target data flow to be identified may be represented by f, and a distance DIST between f and any $j_i$ in J is to be computed in this step.

Figure 11:
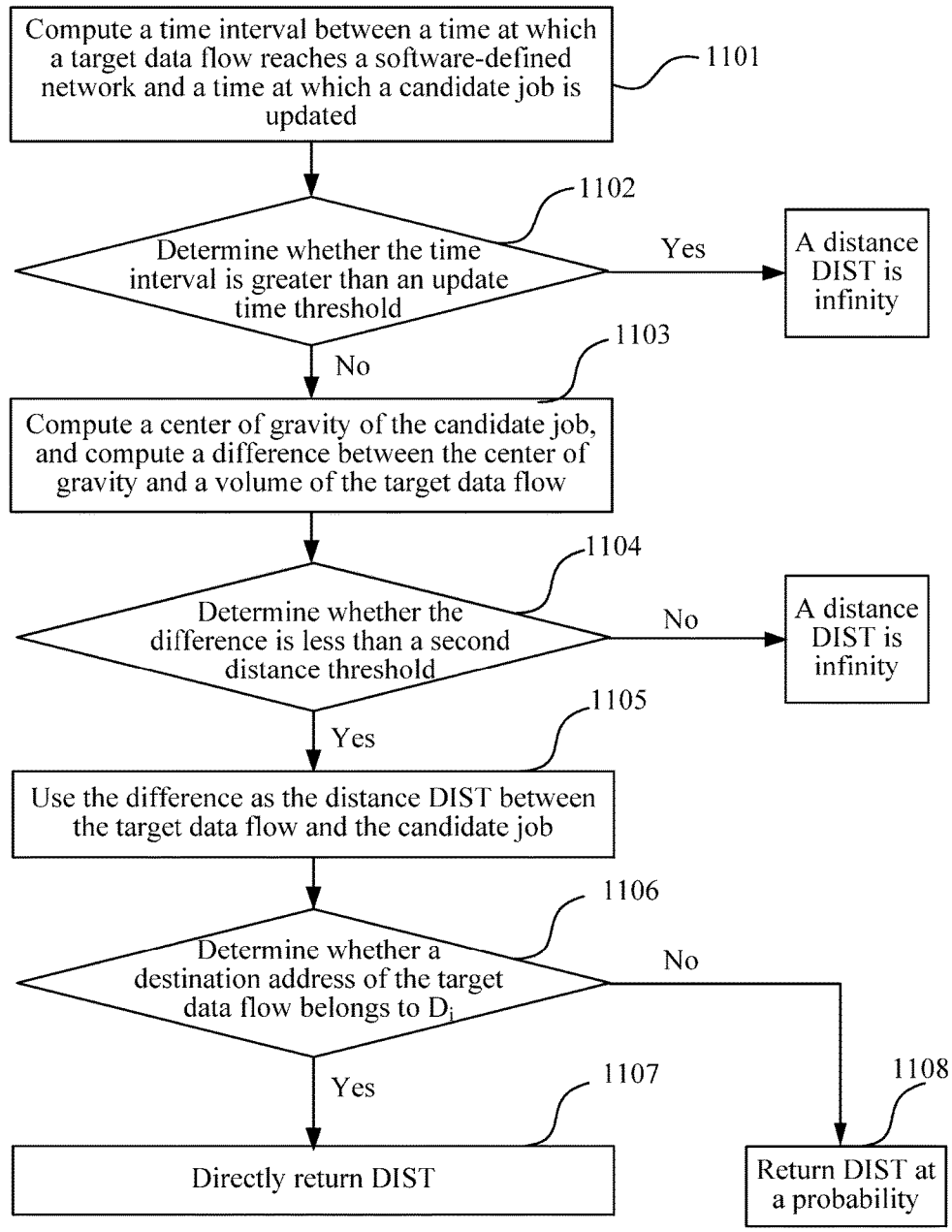
FIG. 11 is a flowchart of distance computing in FIG. 10.

In this step, optionally, a distance DIST computing manner is provided, and for this manner, reference may be made to FIG. 11. FIG. 11 is a flowchart of distance computing in FIG. 10, which may include:

Step 1101: Compute a time interval between a time at which the target data flow reaches the software-defined network and a time at which the candidate job is updated.

In this step, the time interval between the time at which the target data flow reaches the SDN and the time at which the candidate job is last updated is to be computed. The time at which the target data flow f reaches the SDN network may be represented by t, and refers to a time at which f sent by a map host reaches the SDN; and certainly, if a device outside the SDN network performs data mining, the time may also be a time at which f reaches the device.

The time at which the candidate job $j_i$ is updated may be represented by t'. "Updating" refers to that a newly identified data flow is added to $j_i$. For example, $j_i$ already includes two target data flows; if it is identified that another latest data flow belongs to $j_i$, a quantity of target data flows included in $j_i$ is updated to three; and a time at which $j_i$ is updated is referred to as the update time t'.

The time interval to be computed in this step is t-t'.

Step 1102: Determine whether the time interval is greater than an update time threshold.

The update time threshold is set to T. If the time interval t-t' is less than or equal to the update time threshold, step 1103 is performed; otherwise, the distance DIST is infinite, that is, a value of the distance DIST is set to infinity (where infinity indicates that a probability that f belongs to $j_i$ is almost zero), because that the job is not updated for an excessively long time indicates that a possibility that the current target data flow f belongs to $j_i$ is extremely small.

Step 1103: Compute a center of gravity of the candidate job, and compute a difference between the center of gravity and a volume of the target data flow.

The center of gravity G of the candidate job $j_i$ may be computed by using a conventional method, for example, volumes v of all data flows included in $j_i$ may be averaged to obtain the G. The difference between the center of gravity and the volume of f is |G−v|.

Step 1104: Determine whether the difference is less than a second distance threshold.

The second distance threshold is set to Δ. If the difference |G−v| is less than the second distance threshold Δ, step 1105 is performed; otherwise, if the difference |G−v| is greater than or equal to Δ, the distance DIST is infinity, that is, DIST is set to infinity.

Optionally, the second distance threshold Δ herein may be obtained by performing, according to volumes corresponding to previously processed jobs, weighted averaging on first distance thresholds Δi of the jobs (where Δi is used in a subsequent step).

Step 1105: Use the difference as the distance DIST between the target data flow and the candidate job.

Further, after step 1105, 1106 may be further performed.

Step 1106: Determine whether a destination address of the target data flow belongs to $D_i$.

$M_d^i$ and $D_i$ are parameter definitions in a distributed computing system map-reduce, $M_d^i$ is a set of map processes corresponding to a reduce process d belonging to the job $j_i$, and $D_i$ is a set of reduce processes corresponding to the job $j_i$.

If the destination address d of the target data flow f belongs to $D_i$, it indicates that some data flows heading for the reduce process already arrive, and in this case, step 1107 is performed; and if the destination address d of the target data flow f does not belong to $D_i$, step 1108 is performed.

Step 1107: Directly return DIST, that is, DIST computed in step 1105.

Step 1108: Return DIST at a probability.

We add d to the set $D_i$ and add a source address s of f to the set Mdi, and in this case, we return DIST at a probability of 1/|Di|, because a larger quantity of reduce processes indicates a smaller chance that some reduce processes have not appeared yet.

Specifically, a reason for returning DIST at the probability of $1/|D_i|$ is that because a quantity of reduce processes corresponding to a job is limited, as $|D_i|$ increases, a probability that a wrong reduce process is started becomes greater; therefore, the probability of returning DIST should be manually reduced. In specific implementation, a random number between 0 and 1 may be generated before DIST is returned; and if the random number is less than or equal to $1/|D_i|$, we directly return DIST; and if the random number is greater than $1/|D_i|$, we return infinity.

1002: Determine whether the distance is less than a first distance threshold.

In this step, the distance DIST computed in 1001 is compared with the first distance threshold Δi; and if DIST is less than the first distance threshold Δi corresponding to the candidate job $j_i$, it indicates that f belongs to $j_i$, and 1003 is performed; otherwise, 1004 is performed.

It should be noted that Δi is a distance threshold set for each job, and this parameter affects accuracy of classifying data flows of each job. If Δi is excessively large, data flows cannot be accurately distinguished; otherwise, if Δi is excessively small, data flows are classified into jobs whose quantity is greater than an actual quantity. In specific implementation, Δi may be fed back and updated according to a result of a job analysis. For example, an initial value of Δi may be set to a variance multiplied by a constant, where the variance is a variance of distances DIST corresponding to the data flows included in the job, and the constant is, for example, Kσ; and Δi is inversely adjusted according to a final result of identification of data flows as jobs, so as to achieve a better classification effect in subsequent identification.

1003: Use the candidate job corresponding to the distance as the job corresponding to the target data flow.

That is, the target data flow f is a data flow belonging to the candidate job $j_i$, and f is also added to the candidate job $j_i$ based on the originally included data flows.

1004: Correspondingly create a new job for the target data flow, and add the newly created job to the job set.

In this step, a new job $j_{|J|+1}$ may be created for the target data flow f, where |J| is an original total quantity of jobs; therefore, a number of the newly created job is the total quantity added by one, the job $j_{|J|+1}$ currently includes f, and the job set is also updated by adding the newly created job $j_{|J|+1}$ to the original J.

By using the foregoing steps 1001 to 1004, the job $j_i$ or $j_{|J|+1}$ to which the target data flow f belongs is found. For each target data flow to be transmitted in the SDN network, the foregoing job identification process needs to be performed. For example, there are totally five target data flows f1 to f5 are to be transmitted in the SDN network, and for each target data flow, the foregoing steps need to be performed to identify a job corresponding to the target data flow. It may be finally learned that f1 to f3 belong to job $j_1$, f4 and f5 belong to job $j_2$, and a current job set includes $j_1$ and $j_2$.

Further, after the job corresponding to the target data flow is obtained, and before path planning is performed according to data flow information of the job, whether the foregoing result of job classification is accurate may be further checked. For example, there may be a case in which f4 actually belongs to job $j_1$ but is classified into job $j_2$, f3 actually does not belong to any candidate job in the current job set J and belongs to a new job to be created, but it is wrongly determined that f3 is classified into job $j_1$, or the like. This embodiment provides a method for screening out this type of target data flow.

Specifically, if a corresponding job satisfies a data flow deletion condition after a target data flow is added to the job, an update data flow to be deleted is selected from the job, and a correspondence between the update data flow and the job is deleted. That is, an erroneous data flow to be deleted may be referred to as an "update data flow". Because the data flow is erroneous, a correspondence between the update data flow and a job into which the update data flow is already classified needs to be deleted, and it indicates that the update data flow actually does not belong to the job. This type of update data flow is identified according to whether the update data flow satisfies the data flow deletion condition.

The data flow deletion condition includes at least one of the following:

First deletion condition: A quantity of data flows between a pair of a map process and a reduce process in the job is greater than one (that is, actually, only one data flow of a job can be generated between a pair of a map process and a reduce process).

Second deletion condition: A quantity of map processes corresponding to a reduce process of the job exceeds a maximum quantity limit, that is, there is a maximum quantity limit on map processes, which can be requested by a reduce process.

When at least one of the foregoing two conditions is satisfied, a target data flow to be deleted needs to be determined from the job. A specific optional deletion algorithm architecture is provided as follows:

Input to the algorithm is: a source address s, a destination address d, and a volume v of the target data flow f; a center of gravity G of a target data flow $j_i$; a maximum quantity F of map processes, which can be requested, of data; and the like.

```
IF s ∈M_d^i, THEN // some flow from the same map
Find out the flow in j_i from s to d, say it is f' and its volume is v'
IF|G-v|<|G-v'|, THEN
    j_i←j_i ∪ f / f',
    IF f' is a flow of other job by treating is as a new coming flow,
    THEN
        j_k←j_k ∪ f' (say f' is a job in j_k)
    ELSE create a new job j_|J|+1=Φ, j_|J|+1←f' ∪ j_|J|+1, J←J ∪ j_|J|+1
ELSE create a new job j_|J|+1=Φ, j_|J|+1←f ∪ j_|J|+1, J←J ∪ j_|J|+1
ELSE //new map to this reduce
M_d^i←M_d^i ∪ s
IF | M_d^i |>F, THEN // more map than a reduce can support
    Find out f'=arg max |G-v_j|
    IF f'==f, THEN
        create a new job j_|J|+1=Φ, j_|J|+1←f ∪ j_|J|+1, J←J ∪ j_|J|+1
    ELSE IF f' is a flow of other job by treating is as a new coming flow,
    THEN
        j_k←j_k ∪ f' (say f' is a job in j_k)
    ELSE create a new job j_|J|+1=Φ, j_|J|+1←f' ∪ j_|J|+1, J←J ∪ j_|J|+1
```

As can be seen from the foregoing, if the source address s of the target data flow f belongs to $M_d^i$, it indicates that more than one data flow appears between a pair of a map process and a reduce process, and we need to delete a most unsuitable data flow. Assuming that another data flow f' having a same source and destination as that of f exists in $j_i$, and a difference between a volume of f' and G is greater than a difference between a volume of f and G, it indicates that f' needs to be deleted from $j_i$ and f' does not belong to the job $j_i$. When f' is deleted, the foregoing job identification process from 1001 to 1004 needs to be performed again for f'. If f' belongs to another job $j_k$ in the current job set after reclassification, f' is classified into $j_k$; and if f' is still classified into the current job $j_i$ after reclassification, a new job is created for f'.

If the source address s of the target data flow f does not belong to $M_d^i$, and after s is added to $M_d^i$, map processes, requested by a reduce process, exceed the maximum quantity limit F, f' is deleted from the job. It should be noted that when the data flow f' to be deleted is not the last one that arrives, whether the data flow f' belongs to another job is first checked, because that the data flow f' already appears in a network for a time indicates that a job to which the data flow f' belongs should also appear in the network. For example, if the data flow f' belongs to $j_k$, the data flow f' is classified into $j_k$. On the contrary, if the data flow f' to be deleted is the last one that arrives, a new job may be directly created for the data flow f'.

As described above, the foregoing process is actually a process of updating the job $j_i$, and some data flows wrongly classified into $j_i$ are deleted from $j_i$, so as to improve accuracy of classifying data flows according to jobs.

The foregoing process of identifying a corresponding job needs to be performed for each target data flow to be transmitted in the SDN network. Assuming that a data mining module on a device performs job identification, in general, after all target data flows included in a job are basically found, a traffic engineering module may be then instructed to perform path planning corresponding to the job. For example, assuming that job A includes three target data flows f1, f2, and f3, when it is identified that f1 corresponds to A, wait until it is identified that f2 corresponds to A. In this case, the two data flows are already identified for A, and still wait until it is identified that f3 also corresponds to A. After all the data flows included in A are found, the traffic engineering module is then instructed to perform path planning on job A according to data flow information of f1 to f3. As for whether all data flows in a job are found, a time threshold may be set, and it is determined whether the job is updated within a range of the time threshold; and if the job is updated, restart timing before the time threshold is reached, that is, wait again; and if the job is not updated within the range, it indicates that all the data flows in the job are already identified.

The application scenario in FIG. 8 is used as an example. The data mining module identifies a corresponding job for each data flow sent by a map host; starts timing for each job each time after the job is updated (where updating refers to, for example, that a new identified data flow is added to the job); determines that all data flows in the job are already found if the job is still not updated after the time threshold is exceeded; and sends all the data flows of the job to a switch. In other words, when all the data flows in the job are already found, data flow information of the data flows is sent to the traffic engineering module to perform path planning for the job. If a job is updated within a range of the time threshold, timing is restarted.

In this embodiment of the present application, an effect of the foregoing k-means clustering algorithm is further tested, and a selected test environment is a Hadoop system including 29 virtual machines. Hibench generates four types of applications, which include terasort, wordcount, k-means, and pagerank, and the applications totally generate 9 jobs in a network, including 27869 data flows. By using the foregoing clustering algorithm, 27810 data flows are successfully classified into jobs to which the data flows belong, and a correctness percentage is 99.79%.

In the path planning method in the embodiments of the present application, data flows are clustered by means of data mining to find data flows belonging to a same job, and path planning is performed for a job by using data flow information of the job, so that the job is transmitted in an SDN network in a shortest transmission time. In this way, overall performance of the SDN network is improved, a job completion speed is accelerated, and link utilization of the network is increased.

An embodiment of the present application further provides a controller, and the controller may perform the path planning method in the foregoing method embodiments of the present application. In addition, this embodiment of the controller of the present application only simply describes a structure of the controller, and for specific functions and principles, reference may be made to the method embodiments.

Figure 12:
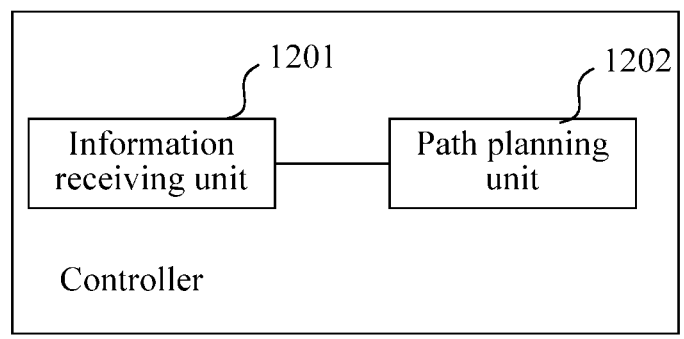
FIG. 12 is a schematic structural diagram of a controller according to an embodiment of the present application.

FIG. 12 is a schematic structural diagram of a controller according to an embodiment of the present application. As shown in FIG. 12, the controller may include: an information receiving unit 1201 and a path planning unit 1202.

The information receiving unit 1201 is configured to acquire data flow information of a to-be-transmitted job in a software-defined network SDN, where the job includes at least one target data flow, and the data flow information of the job includes: a source address, a destination address, and a volume of each target data flow.

The path planning unit 1202 is configured to perform overall path planning on the to-be-transmitted job according to the source address, the destination address, and the volume of each target data flow in the data flow information of the job, where the overall path planning includes simultaneously planning a transmission path corresponding to each target data flow included in the to-be-transmitted job; and obtain a job transmission path over which the to-be-transmitted job is transmitted in the software-defined network in a shortest job transmission time, where the job transmission time is a time needed to complete transmission of the job in the software-defined network, and the job transmission path includes the transmission path corresponding to each target data flow in the job.

Optionally, the path planning unit 1202 may be specifically configured to:

determine a path planning condition, where the path planning condition includes that after the corresponding transmission path is allocated to each target data flow, each network node of the software-defined network satisfies conservation of volume, each transmission link of the software-defined network satisfies a maximum link capacity limit condition, and a total volume of the job is less than or equal to the job transmission time multiplied by a bandwidth of the job, where the transmission path includes: a transmission link and a bandwidth on the transmission link, the total volume of the job is a sum of a volume of the at least one target data flow, and the bandwidth of the job is a sum of a bandwidth of the at least one target data flow;

among the transmission links in the software-defined network, exhaustively list candidate job transmission paths satisfying the path planning condition, where the candidate job transmission paths include a transmission link corresponding to each target data flow and a bandwidth on the transmission link, and the transmission link is used to transmit the target data flow from the source address to the destination address; and obtain a corresponding job transmission time for each of the candidate job transmission paths; and select the candidate job transmission path corresponding to the minimum job transmission time as a final job transmission path.

In specific implementation, the controller may only have a function of path planning according to the data flow information of the job, and is, for example, the controller in FIG. 8 or FIG. 9. For the controllers in these two figures, both the information receiving unit 1201 and the path planning unit 1202 may be located in a traffic engineering module. Certainly, if the traffic engineering module including the information receiving unit 1201 and the path planning unit 1202 is not disposed in a controller of an SDN network, and is located in a device outside the SDN network in specific implementation, the device is equivalent to the controller described in this embodiment of the present application, and still falls within the scope of this embodiment.

Figure 13:
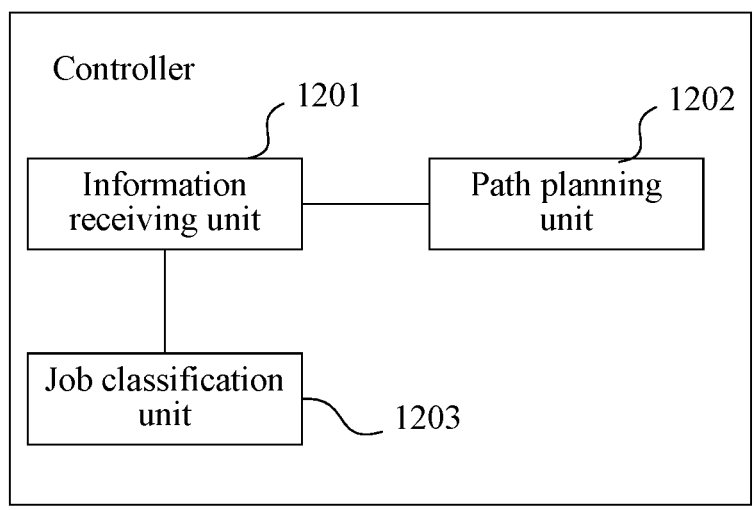
FIG. 13 is a schematic structural diagram of another controller according to an embodiment of the present application.

Further, the controller in this embodiment may also simultaneously have functions of path planning and job identification for a data flow, and in this case, for a structure of the controller, reference may be made to FIG. 13. FIG. 13 is a schematic structural diagram of another controller according to an embodiment of the present application. Based on the structure shown in FIG. 12, the controller further includes a job classification unit 1203, configured to: for each target data flow to be transmitted in the software-defined network, acquire the data flow information of the target data flow, and perform clustering computing according to the data flow information to obtain a job corresponding to the target data flow. For example, referring to FIG. 7, the job classification unit 1203 may be located in a data mining module of the controller.

Figure 14:
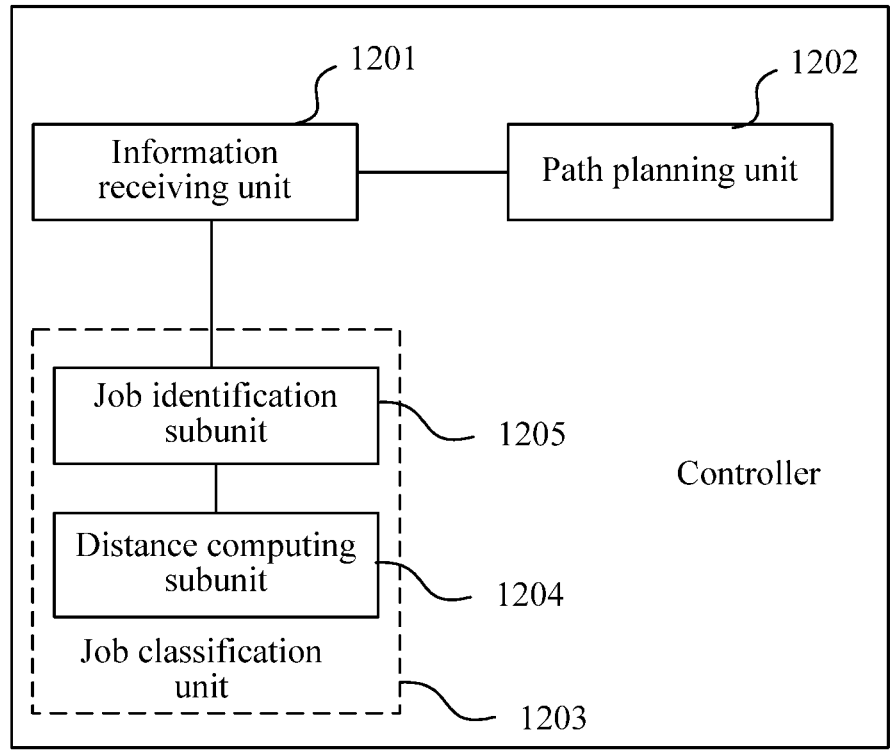
FIG. 14 is a schematic structural diagram of still another controller according to an embodiment of the present application.

FIG. 14 is a schematic structural diagram of still another controller according to an embodiment of the present application. Based on the structure shown in FIG. 13, optionally, the job classification unit 1203 may specifically include a distance computing subunit 1204 and a job identification subunit 1205.

The distance computing subunit 1204 is configured to compute a distance between the target data flow and each candidate job, where the candidate job is located in a job set used to represent all jobs to be transmitted in the software-defined network.

The job identification subunit 1205 is configured to: when the distance is less than a first distance threshold corresponding to the candidate job, use the candidate job corresponding to the distance as the job corresponding to the target data flow; otherwise, correspondingly create a new job for the target data flow, and add the newly created job to the job set.

Further, the distance computing subunit 1204 is specifically configured to:

compute a time interval between a time at which the target data flow reaches the software-defined network and a time at which the candidate job is last updated; and if the time interval is less than or equal to an update time threshold, continue to compute a difference between a center of gravity of the candidate job and the volume of the target data flow; and if the difference is less than a second distance threshold, use the difference as the distance between the target data flow and the candidate job.

Figure 15:
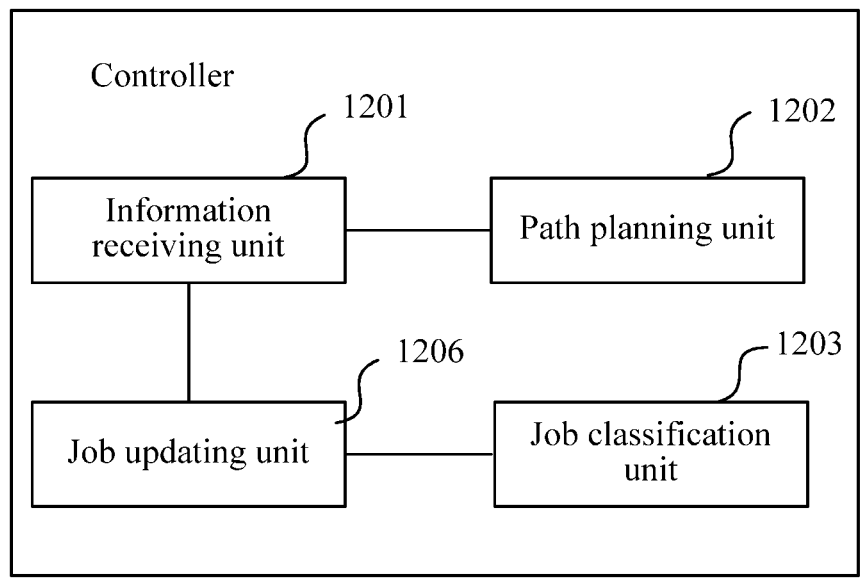
FIG. 15 is a schematic structural diagram of yet another controller according to an embodiment of the present application.

FIG. 15 is a schematic structural diagram of yet another controller according to an embodiment of the present application. Based on the structure shown in FIG. 13, optionally, the controller may further include:

a job updating unit 1206, configured to: when the job satisfies a data flow deletion condition after the target data flow is added to the job, select a to-be-deleted update data flow from the job, and delete a correspondence between the update data flow and the job, where the data flow deletion condition includes at least one of the following: a quantity of data flows between a pair of a map process and a reduce process in the job is greater than one, or a quantity of map processes corresponding to a reduce process of the job exceeds a maximum quantity limit.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disc, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A path planning method, comprising:
   acquiring, by a controller, a data flow information for a plurality of target data flows to be transmitted in a software-defined network;
   performing, by the controller, a clustering computing according to the data flow information to identify a task corresponding to at least one target data flow, wherein the data flow information of the task comprises a source address, a destination address, and a volume of each target data flow of the at least one target data flow;
   generating a set of candidate processing operations for each target data flow of the at least one target data flow;
   computing, by the controller for each candidate processing operation of the set of candidate processing operations, a processing time distance between the each target data flow and each candidate processing operation of the set of candidate processing operations, and computing sets of processing time distances corresponding to each candidate processing operation, wherein the each candidate task is located in a task set used to represent all tasks to be transmitted in the software-defined network;
   comparing, by the controller, each processing time distance to a first distance threshold;
   using, by the controller, the candidate processing operation corresponding to the processing time distance as the task corresponding to the target data flow when the processing time distance is less than the first distance threshold corresponding to the candidate processing operation, and creating a new task for the target data flow and adding the newly created task to the task set when the processing time distance is equal to or greater than the first distance threshold;
   generating, by the controller, all possible path combinations comprising candidate processing operations for the each target data flow, with the generating using the source address, the destination address, and the volume of the each target data flow in the data flow information of the task, wherein an overall path planning comprises planning a transmission path corresponding to each target data flow in the task;
   selecting, by the controller, a task transmission path comprising a shortest total task transmission time; and
   instructing, by the controller, at least one switch to perform forwarding based on a forwarding information table generated by the controller according to the selected task transmission path.

2. The method according to claim 1, wherein the selecting the task transmission path comprising the shortest total task transmission time comprises:
   determining a path planning condition, wherein the path planning condition comprises that after the corresponding transmission path is allocated to the each target data flow, each network node of the software-defined network satisfies conservation of volume, each transmission link of the software-defined network satisfies a maximum link capacity limit condition, and a total volume of the task is less than or equal to the task transmission time multiplied by a task bandwidth, wherein the transmission path comprises: a transmission link and a bandwidth on the transmission link, the total volume of the task is a sum of a volume of the each target data flow, and the bandwidth of the task is a sum of one or more bandwidths of the at least one data flow of the at least one target data flow; and
   among the transmission links in the software-defined network, exhaustively listing candidate task transmission paths satisfying the path planning condition, wherein the candidate task transmission paths comprise a transmission link corresponding to each target data flow and a bandwidth on the transmission link, and the transmission link is used to transmit the each target data flow from the source address to the destination address; and obtaining a corresponding task transmission time for each candidate task transmission path.

3. The method according to claim 1, wherein the computing the processing time distance between the each target data flow and the each candidate processing operation comprises:
   computing a time interval between a time at which the each target data flow reaches the software-defined network and a candidate task last updated time; and
   if the time interval is less than or equal to an update time threshold, continuing to compute a difference between a center of gravity of the candidate task and a volume of the target data flow; and if the difference is less than a second distance threshold, using the difference as the processing time distance between the target data flow and the candidate processing operation.

4. The method according to claim 1, after the identifying the task corresponding to the at least one target data flow, before the generating the all possible path combinations, further comprising:
   if the task satisfies a data flow deletion condition after the each target data flow is added to the task, selecting a to-be-deleted update data flow from the task, and deleting a correspondence between the update data flow and the task, wherein the data flow deletion condition comprises at least one of the following: a quantity of data flows between a pair of a map process and a reduce process in the task is greater than one, or a quantity of map processes corresponding to a reduce process of the task exceeds a maximum quantity limit.

5. A controller, comprising:
   an information receiving device, configured to:
      acquire a data flow information for a plurality of target data flows to be transmitted in a software-defined network;
      perform a clustering computing according to the data flow information to identify a task corresponding to at least one target data flow, wherein the data flow information of the task comprises a source address, a destination address, and a volume of each target data flow of the at least one target data flow;

generate a set of candidate processing operations for each target data flow of the at least one target data flow;

compute, for each candidate processing operation of the set of candidate processing operations, a processing time distance between the each target data flow and each candidate processing operation of the set of candidate processing operations, and computing sets of processing time distances corresponding to each candidate processing operation, wherein the each candidate task is located in a task set used to represent all tasks to be transmitted in the software-defined network;

compare each processing time distance to a first distance threshold;

use the candidate processing operation corresponding to the processing time distance as the task corresponding to the target data flow when the processing time distance is less than the first distance threshold corresponding to the candidate processing operation, and create a new task for the target data flow and adding the newly created task to the task set when the processing time distance is equal to or greater than the first distance threshold;

a path planning device, configured to:

generate all possible path combinations comprising candidate processing operations for the each target data flow, with the generating using the source address, the destination address, and the volume of the each target data flow in the data flow information of the task, wherein an overall path planning comprises planning a transmission path corresponding to the each target data flow in the task;

select a task transmission path comprising a shortest total task transmission time; and instruct at least one switch to perform forwarding based on a forwarding information table generated according to the selected task transmission path.

6. The controller according to claim 5, wherein the path planning device is configured to:

determine a path planning condition, wherein the path planning condition comprises that after the corresponding transmission path is allocated to the each target data flow, each network node of the software-defined network satisfies conservation of volume, each transmission link of the software-defined network satisfies a maximum link capacity limit condition, and a total volume of the task is less than or equal to the task transmission time multiplied by a task bandwidth, wherein the transmission path comprises: a transmission link and a bandwidth on the transmission link, the total volume of the task is a sum of a volume of the each target data flow, and the bandwidth of the task is a sum of one or more bandwidths of the each target data flow of the at least one target data flow; and among the transmission links in the software-defined network, exhaustively list candidate task transmission paths satisfying the path planning condition, wherein the candidate task transmission paths comprise a transmission link corresponding to the each target data flow and a bandwidth on the transmission link, and the transmission link is used to transmit the each target data flow from the source address to the destination address; and obtain a corresponding task transmission time for each candidate task transmission path.

7. The controller according to claim 5, wherein the information receiving device is configured to:

compute a time interval between a time at which the each target data flow reaches the software-defined network and a candidate task last updated time; and if the time interval is less than or equal to an update time threshold, continue to compute a difference between a center of gravity of the candidate task and a volume of the target data flow, and if the difference is less than a second distance threshold, use the difference as the processing time distance between the target data flow and the candidate processing operation.

8. The controller according to claim 5, further comprising:

a task updating device, configured to:

when the task satisfies a data flow deletion condition after the each target data flow is added to the task, select a to-be-deleted update data flow from the task; and delete a correspondence between the update data flow and the task, wherein the data flow deletion condition comprises at least one of the following: a quantity of data flows between a pair of a map process and a reduce process in the task is greater than one, or a quantity of map processes corresponding to a reduce process of the task exceeds a maximum quantity limit.

* * * * *

UNITED STATES PATENT AND TRADEMARK OFFICE
CERTIFICATE OF CORRECTION

PATENT NO. : 10,187,291 B2
APPLICATION NO. : 14/980491
DATED : January 22, 2019
INVENTOR(S) : Geng et al.

Page 1 of 1

It is certified that error appears in the above-identified patent and that said Letters Patent is hereby corrected as shown below:

In the Specification

Column 5, Line 15: replace "is a flowchart of job" with --is a flowchart of a job--
Column 5, Line 39: replace "100k" with --100--
Column 6, Line 42: replace "foregoing example" with --foregoing example of--
Column 7, Line 59: replace "first reach a switch" with --first reaches a switch--
Column 9, Line 4: replace "data flow, and j" with --data flow, j--
Column 9, Line 5: replace "data flow; $d_{ij}$" with --data flow; and $d_{ij}$--

Signed and Sealed this
Fourth Day of October, 2022

Katherine Kelly Vidal
*Director of the United States Patent and Trademark Office*